United States Patent [19]

Raidl, Jr.

[11] 4,085,764

[45] Apr. 25, 1978

[54] APPARATUS FOR PROTECTING A GAS PRESSURE SYSTEM FROM OVER PRESSURE

[76] Inventor: John H. Raidl, Jr., 6625 Milhaven Dr., Shawnee Mission, Kans. 66202

[21] Appl. No.: 623,593

[22] Filed: Oct. 20, 1975

[51] Int. Cl.² ............................................. F16K 17/40
[52] U.S. Cl. .................................. 137/68 R; 137/312; 137/613; 220/89 A
[58] Field of Search ......................... 137/68 R, 69, 71; 220/89 A

[56] References Cited

U.S. PATENT DOCUMENTS

| 2,661,121 | 12/1953 | Coffman et al. ............... | 220/89 A |
| 2,856,096 | 10/1958 | Philip ............................ | 220/89 A |
| 2,895,492 | 7/1959 | Bell ............................... | 137/68 R |
| 3,448,750 | 6/1969 | Parks ......................... | 220/89 A X |
| 3,685,686 | 8/1972 | Raidl ............................ | 220/89 A |
| 3,834,581 | 9/1974 | Solter et al. .................. | 220/89 A |
| 3,906,977 | 9/1975 | Summers et al. ............... | 137/71 |

FOREIGN PATENT DOCUMENTS 20,873 of 1915 United Kingdom .............. 137/68 R

Primary Examiner—Martin P. Schwadron
Assistant Examiner—Richard Gerard
Attorney, Agent, or Firm—Koenig, Senniger, Powers and Leavitt

[57] ABSTRACT

Apparatus for protecting a fluid pressure system from over-pressure, comprising a dome-shaped, reverse acting rupture disk adapted to be installed in an outlet of the fluid pressure system with its convex face resisting the system pressure, the reverse acting rupture disk being adapted to abruptly snap over center when subjected to a pre-determined pressure level, and a knife blade assembly disposed adjacent the back or concave face of the reverse acting rupture disk for cutting it as it snaps over center. The apparatus further includes a dome-shaped, prebulged rupture disk separated from the reverse acting rupture disk by a spacer ring, the prebulged disk having its concave face toward the reverse acting rupture disk whereby the prebulged disk entraps any fluid that may leak past the reverse acting rupture disk and will reliably burst when its concave face is subjected to the system fluid pressure upon the rupture of the reverse acting rupture disk.

14 Claims, 3 Drawing Figures

APPARATUS FOR PROTECTING A GAS PRESSURE SYSTEM FROM OVER PRESSURE

BACKGROUND OF THE INVENTION

This invention relates to over-pressure relief apparatus and more particularly to a dual rupture disk assembly which reliably bursts when subjected to a predetermined pressure level.

More generally, in large, continuous-process fluid pressure systems, such as are used in uranium enrichment plants, oil refineries or other process industries, the system must be protected from operating above prescribed pressure limits. Typically, pressure relief valves are provided at many locations around the pressure system. These relief valves may be similar to those shown in my U.S. Pat. No. 3,872,875 in which a valve member is resiliently held closed against a valve seat by a spring. As the system pressure increases, the spring must withstand more of the system pressure. At the set pressure of the relief valve, the forces applied to the valve member by the system pressure and by the spring are balanced so that any increase in system pressure will cause the valve member to open and to vent the system. Even at normal system operating pressures appreciably below the set pressure of the relief valve, these relief valves often tend to leak. As shown in my above-mentioned U.S. patent, reverse acting rupture disks are used to isolate such spring-operated relief valves from the system pressure and to thus provide a leak-tight system. Typically, these relief valve isolators utilize a reverse acting rupture disk having its convex face subjected to the system pressure. Upon the rupture disk being subjected to a predetermined pressure level, it will abruptly snap over center. Knife blades are provided on the back side of the rupture disk to cut it as it snaps over center thereby to subject the relief valve to the system pressure.

In other over-pressure relief systems, two prebulged rupture disks have been used in tandem. Generally, these tandem prebulged disks are mounted between a pair of piping flanges and require a pair of mounting rings each engageable with a respective piping flange and a respective prebulged rupture disk and a spacer ring between the rupture disks. One of the prebulged rupture disks, constituting a primary disk, has its concave face subjected to the system pressure so that upon the system pressure exceeding a predetermined level, it will fail thus instantaneously subjecting the other prebulged disk to the system pressure which in turn causes it to fail. The second prebulged rupture disk also has its concave face toward the system pressure and it serves as a backup to the primary disk so as to entrap any fluid which may have leaked past the primary disk. Typically, these prebulged rupture disks must be accurately mounted in precision machined mounting rings so as to insure that the prebulged rupture disks will fail at their predetermined pressure level. During installation of the prebulged disks, precise alignment of the prebulged disks in their mounting rings and accurate tightening of the bolts holding the mounting rings together are required to insure the disks will reliably rupture at their predetermined burst pressures. Also, by requiring two mounting rings and a spacer ring for mounting the prebulged rupture disks, at least two interfaces (i.e., a first interface between the outlet piping flange and the first mounting ring and a second interface between the first mounting ring and the primary prebulged rupture disk) must be made leak tight.

Generally, with prebulged rupture disks the maximum operating pressure of the system is limited to 70% of the minimum burst pressure of the prebulged disks. This means that the pressure system must be significantly over-designed to accommodate the increase in pressure from its maximum operating pressure until the minimum burst pressure of the prebulged rupture disk is attained.

SUMMARY OF THE INVENTION

Among the several objects and features of this invention may be noted the provision of a dual rupture disk pressure relief system which requires a minimum number of parts to mount the system between the pair of piping flanges; the provision of such a pressure relief system which has a minimum number of system pressure interface seals; the provision of such a pressure relief system which does not require precision machined mounting rings; the provision of such a relief system in which the pressure system may be operated to within 90% of the predetermined relief pressure of the relief system; the provision of such a pressure relief system in which the components are substantially self-aligning with respect to one another upon installation; the provision of such a pressure relief system which may be readily installed in existing pressure systems or which may be readily incorporated as original equipment in newly designed pressure systems without special tools and without special training of the installation personnel; the provision of such a pressure relief system which is economical; and the provision of such a pressure relief system which is reliable in operation. Other objects and features of this invention will be in part apparent and in part pointed out hereinafter.

Briefly, apparatus of this invention for protecting a fluid pressure system from over-pressure comprises an assembly of a reverse acting rupture disk means, knife means, a spacer ring, and prebulged rupture disk means adapted to be sealingly mounted in an outlet of said system between inner and outer companion flanges of the outlet. The reverse acting rupture disk means has a part-spherical thin rupturable dome and a generally flat annular flange surrounding the dome and integral therewith. This last-mentioned annular flange fits on the inner flange of the outlet with the reverse acting dome being directed upstream in the outlet for exposure of the convex face of the dome to the system fluid pressure. The reverse acting dome is adapted to snap over center from a convex to a concave configuration upon the system fluid pressure exceeding a predetermined fluid pressure level. The spacer ring fits on the face of the annular flange of the reverse acting dome opposite the inner flange of the outlet. The prebulged rupture disk means comprises a part-spherical, thin rupturable dome and an annular flange surrounding the prebulged dome and being integral therewith. One face of this last-said annular flange fitting on the other face of the spacer ring and the other face of the annular flange fitting on the outer flange of the outlet with the concave face of the prebulged dome facing the concave face of the reverse acting dome whereby the prebulged dome is adapted to burst upon its concave face being subjected to the system fluid pressure as occasioned by the rupture of the reverse acting dome.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
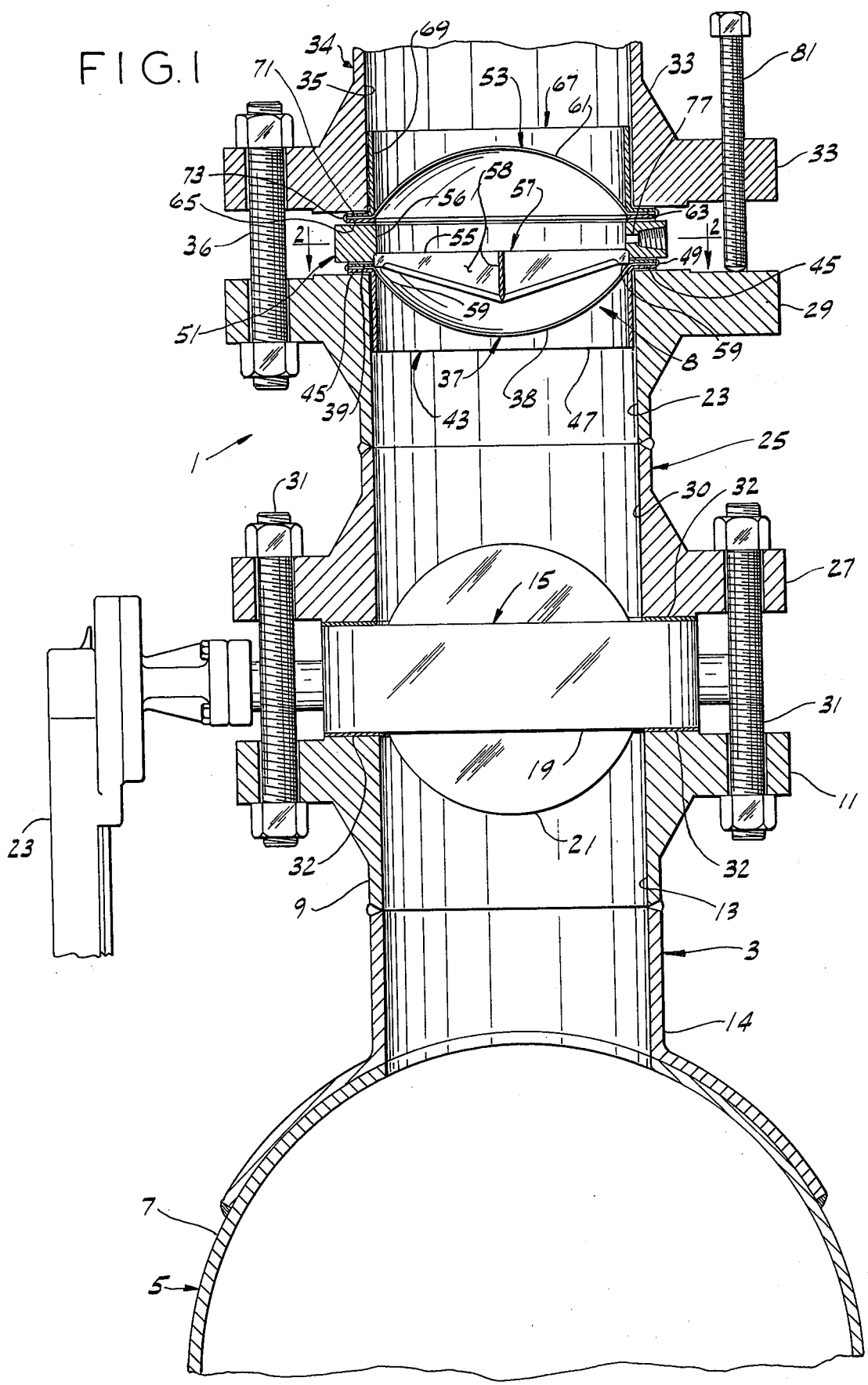
FIG. 1 is a vertical cross-sectional view of over-pressure relief apparatus of this invention installed on a pressure relief outlet of a fluid pressure system.
Figure 2:
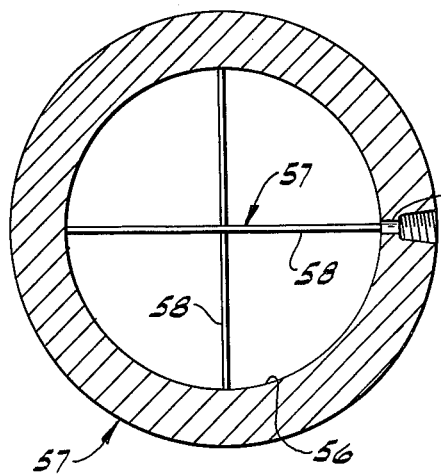
FIG. 2 is a horizontal cross-sectional view taken on line 2—2 of FIG. 1 illustrating a knife blade assembly for cutting a reverse acting rupture disk upon the latter abruptly snapping over center.

Referring now to the drawings, over-pressure relief apparatus of this invention, indicated in its entirety at 1, is shown secured to an outlet 3 of a fluid pressure system 5. More particularly, the fluid pressure system may be a tank or a relatively large diameter pipe, such as indicated at 7 in FIG. 1, forming a part of a fluid pressure system used in an industrial process, (e.g., a uranium enrichment process, an oil refinery process, or the like). Typically, the pressure system is designed to operate at a normal operating pressure level, and is, of course, designed to handle system pressures appreciably above its normal operating pressure level. The pressure relief apparatus 1 of this invention includes means, as generally indicated at 8, rupturable in the event the system pressure exceeds a predetermined over-pressure limit to relieve pressure from the system. This over-pressure limit is selected to be below the ultimate design pressure of the fluid pressure system. As shown in FIG. 1, outlet 3 is a standard piping flange, such as a 6-inch ANSI forged steel schedule 40 flange, having a neck 9 and a flange ring 11 at the outer end of the neck with a bore 13 therethrough in communication with the system pressure within pipe 7. Preferably, neck 9 is welded to pipe 7 by means of an appropriate T-fitting 14 or the like.

In accordance with this invention, a shutoff valve, as generally indicated at 15, is sealingly seated on flange 11 to block rupturable pressure relief means 8 from the system pressure. Preferably, shutoff valve 15 is a butterfly valve having a valve body 19 and a valve member 21 rotatable relative to the valve body between a normally open position (as shown in FIG. 1) and a closed position (not shown) for blocking the flow of fluid from pipe 7 through outlet 3 for purposes as will appear. The valve member may be selectively moved between its open and closed position by means of an actuating handle 23. Normally, valve 15 is in its open position so that the fluid pressure system acts against rupturable pressure relief means 8 in a manner as will be hereinafter described.

A connector 25 comprising a set of standard flanges butt-welded together in end-to-end relation and having mounting flanges 27 and 29 at opposite ends thereof and a bore 30 therethrough is sealingly seated on the face of valve body 19 opposite from flange 11. A plurality of bolts 31 interconnect flanges 11 and 27 and compress asbestos gaskets 32 disposed between valve body 19 and flanges 11 and 27 so as to sealingly seat the valve body between these flanges.

Rupturable pressure relief means 8 of this invention is sealingly secured between flange 29 and another standard piping flange, as indicated at 33, constituting a portion of a discharge piping system 34. Flanges 29 and 33 constitute a pair of companion flanges on outlet 3 with flange 29 being referred to as an inner or upstream flange and with flange 33 being referred to as an outer or downstream flange. Flange 33 has a bore 35 therethrough. Flanges 33 and 29 are adapted to be secured together by bolts 36. With flanges 29 and 33 bolted together it will be noted that bore 30 in connector 17 and bore 35 in discharge piping flange 33 are in alignment with one another and with bore 13 in outlet 3. Discharge piping system 34 collects process fluid discharged from opening 3 in the event the pressure relief system of this invention is actuated.

Figure 3:
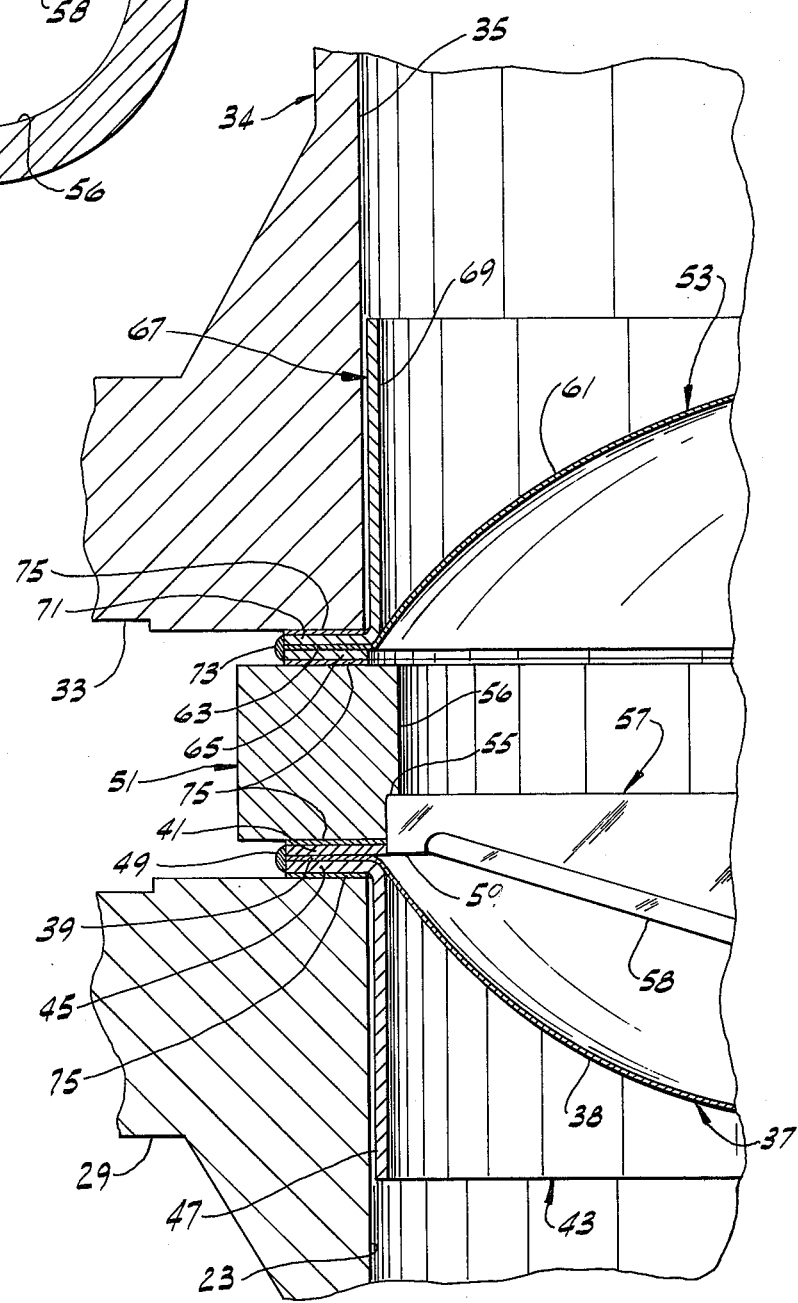
FIG. 3 is an enlarged view of a portion of FIG. 1 illustrating details of the over-pressure relief apparatus of this invention.

More particularly, pressure release system 1 is shown to comprise an assembly of reverse acting rupture disk means, knife means, a spacer ring, and prebulged rupture disk means as will be hereinafter described in detail adapted to be sealingly mounted between companion flanges 29 and 33 of outlet 3. As indicated at 37, reverse acting rupture disk means includes a part spherical dome 38 of thin, rupturable material having an annular flange 39 (see FIG. 3) integral with and surrounding the dome. Flange 39 is adapted to fit on flange 29 in a manner as will appear. Preferably, the dome may be made of a stainless steel or other suitable alloy and is accurately formed so that with its annular flange 39 uniformly supported, it will reliably snap over center from a convex to a concave configuration when its convex face is subjected to fluid pressure above a predetermined pressure level (referred to as the set pressure). Rupture disk assembly 37 further includes a sealing ring 41 disposed on the outlet face of the annular dome flange 39 (i.e., on the face of the dome flange facing away from the dome). As indicated at 43, a combination sealing ring and guide sleeve is secured to the inlet face of flange 39 of the reverse acting rupture disk 37. This combination ring and sleeve includes a sealing ring 45 engageable with flange 39 for uniformly supporting dome 38 and a tubular sleeve 47 of somewhat smaller diameter than bore 23 of connector 25. Sealing rings 41 and 45 are shown to be substantially thicker (and thus stiffer) than annular dome flange 39 and are accurately centered with respect to dome 38 so that the dome is uniformly supported by the sealing rings. The rings are sealingly secured to dome flange 39, as by a continuous leak-tight seal weld 49 around the outer periphery of the rings and the dome flange. Thus, reverse acting rupture disk assembly 37 may readily be aligned with respect to bore 23 of connector 25 merely by dropping tubular sleeve 47 into bore 23. With dome 38 and sealing ring 41 welded to sealing ring 45, the dome is permanently aligned with its sealing rings so as to be uniformly supported thereby thus insuring that it will abruptly snap over center when its convex face is subjected to its predetermined set pressure.

The over-pressure relief system of this invention further comprises a spacer ring 51 and prebulged rupture disk means 53. As shown in FIG. 1, the spacer ring fits on the back or outer face of annular flange 39 of reverse acting dome 38 (i.e., it sealingly engages sealing ring 41). Spacer ring 51 has a shoulder 55 around its inner bore 56 facing toward dome 38 for supporting knife means 57. The latter comprises a pair of diametric knife blades 58 disposed perpendicularly relative to one another with their ends bearing on shoulder 55 and secured (i.e., welded) to the spacer ring. The knife blade assembly is disposed on the back or concave face of dome 38 so as to impale and to cut the reverse acting dome as it abruptly snaps over center. Each knife blade 58 has a portion 59 at the ends thereof which extends below the lower surface of spacer ring 51 for engagement with sealing ring 41 thereby to center the spacer ring with respect to reverse acting rupture disk assembly 37.

The prebulged rupture disk assembly 53 is shown to comprise a prebulged, part-spherical dome 61 of thin, rupturable material, such as a suitable stainless steel or other alloy, having an annular flange 63 surrounding the dome and integral therewith. This annular flange fits on one face of spacer ring 51 and outer flange 33. A first sealing ring 65 is positioned on the pressure side of flange 63 (i.e., on the side of the flange toward the concave face of dome 61) and a combination sealing ring and guide sleeve 67 (similar to sleeve 43 heretofore described) is secured to the other face of flange 63. More particularly, the combination sealing ring and guide sleeve 67 has a tubular sleeve 69 and an integral flange 71 constituting a sealing ring for the prebulged dome. Sealing ring 65, flange 63 and flange 71 are welded together by a seal weld 73 around the periphery of the rings to form a leak-tight assembly. Sleeve 69 is adapted to be received in bore 35 of discharge piping system 34 to align prebulged rupture disk assembly 53 with respect to bore 35. In both the reverse acting rupture disk assembly 37 and the prebulged rupture disk assembly 53, gaskets 75 are provided at the interfaces between sealing rings 45 and 71 and the flanges 29 and 33, and between the sealing rings 41 and 65 and spacer ring 51 to seal the rupture disk assemblies and the spacer ring relative to one another and relative to piping flanges. It will be noted that with the over-pressure relief system 1 of this invention, only one interface (i.e., between mounting ring 45 and flange 29) need be sealed to continuously withstand the system pressure. It will be appreciated that this significantly reduces the tendency of the system of the invention to leak.

As indicated at 77, a radial port in spacer ring 51 provides communication into the space between domes 37 and 61. This port may be connected to a tell-tale guage (not shown) to determine if any system fluid has leaked past dome 37. The port may also be connected to a collection system (also not shown) for preventing the escape of the system fluid into the atmosphere. Thus, it will be noted that the primary function of the prebulged disk assembly 53 is to entrap any fluid which may have leaked past the reverse acting rupture disk. It will also be noted that guide sleeves 47 and 69 are somewhat longer than the height of their respective domes 38 and 61 thereby to protect the respective domes from damage (i.e., to protect them from being dented).

To install the over-pressure relief apparatus 1 of this invention in an outlet 3, the guide sleeve 47 of reverse acting rupture disk assembly 37 is dropped into bore 23 of the outlet. This fits annular flange 39 of dome 38 on inner mounting flange 29 and automatically centers dome 38 with bore 23. Since sealing rings 41 and 45 are pre-aligned and centered relative to dome 38 and welded together by seal weld 49 at the factory, workmen need not align the sealing rings with the dome upon installation. The seal weld substantially eliminates the possibility of leakage between the sealing rings and flange 39 and thus the only interface that must be sealed leak-tight is between flange 29 and sealing ring 45. Gasket 75 insures this seal. Sealing ring 51 along with knife means 57 is fitted on the back face of sealing ring 41. Tabs 59 center the sealing ring relative to dome 38. Like reverse acting rupture disk assembly 37, prebulged rupture disk assembly 53 fits on flange 33 and is self-aligned to bore 35 of discharge piping 34 by its guide sleeve 69. Bolts 36 draw the companion flanges 29 and 33 together to hold reverse acting rupture disk assembly 37, spacer ring 53, and prebulged rupture disk assembly 53 in sealing engagement. It will be particularly noted that no special assembly techniques, precision-machined mounting rings, or bolt torquing procedures are required to install the over-pressure relief apparatus of this invention.

In operation with valve member 21 open, the system pressure acts against the convex face of the reverse acting rupture dome 38. The pressure system may normally be operated at pressures up to 90% of the set pressure (at a specified temperature) for the reverse acting rupture disk. Upon the system pressure exceeding the set pressure of the reverse acting disk, it will buckle and abruptly snap over center. This causes dome 38 to be impaled on knife blade assembly 57 thereby to cut the dome into four wedge-shaped segments. The system pressure folds these segments back against the bore 56 of spacer ring 51 thereby instantaneously placing the concave face of the prebulged rupture disk assembly 53 in communication with the system pressure. The prebulged rupture disk is so selected as to have a predetermined burst pressure equal to (or preferably somewhat less than) the set pressure of the reverse acting rupture dome 38. Thus upon the failure of the reverse acting rupture disk, the system pressure causes the prebulged disk to immediately fail in tension thus opening the system to discharge piping system 34. It will also be noted that the wedge-shaped segments of the reverse acting dome 38 are securely held in place by flange 39 and thus are not propelled downstream into the discharge piping system 34 by the system pressure. It will also be noted that upon failure of both the reverse acting and prebulged disks that fluid pressure may flow out of outlet 3 substantially without restriction thus permitting the system pressure to be reduced to a safe level as rapidly as possible.

Upon the system returning to its safe operating pressure level, valve 15 interposed between outlet 3 and reverse acting rupture disk 37 may be closed thereby to block outlet 3 so as to isolate the rupture disks from the system pressure thereby to permit the pressure relief system 1 of this invention to be replaced. As is conventional, flange 33 may carry jackscrews 81 for forcibly separating flanges 29 and 33 so as to enable ready replacement of the pressure relief system of this invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for protecting a fluid pressure system from over-pressure comprising an assembly of a reverse acting rupture disk means, knife means, a spacer ring, and a prebulged rupture disk means adapted to be sealingly mounted in an outlet of said system between inner and outer companion flanges of the outlet, said reverse acting rupture disk means having a part spherical, thin rupturable dome and a generally flat annular flange surrounding the dome and integral therewith, the flange of the reverse acting dome fitting on the inner flange of the said outlet with said dome being directed upstream in said outlet for exposure of the convex face of the reverse acting rupture dome to the system fluid pressure, said reverse acting dome being adapted to snap over center from a convex to a concave configuration upon said system fluid pressure exceeding a predetermined pressure level, said spacer ring fitting on the face of said flange of said reverse acting dome opposite said inner flange of said outlet, said knife means being carried by said spacer ring for cutting said reverse acting dome as the latter snaps over center, said prebulged rupture disk means comprising a part spherical, thin rupturable dome and an annular flange surrounding said prebulged dome and being integral therewith, one face of said annular flange of said prebulged dome fitting on the other face of said spacer ring and the other face of the last-said annular flange fitting on the outer flange of said outlet with the concave face of said prebulged dome facing the concave face of said reverse acting dome whereby said prebulged dome is adapted to burst upon its concave face being subjected to said system fluid pressure as occassioned by the rupture of said reverse acting dome, said outlet having a circular bore, and said apparatus further comprising guide means for alignment of said dome of said reverse acting rupture disk means with respect to the bore of said outlet, said guide means comprising a tubular sleeve of somewhat smaller diameter than the diameter of said bore of said outlet, said sleeve being secured to said annular flange of said reverse acting dome and extending into said bore whereby said sleeve centers said reverse acting dome with respect to said bore.

2. Apparatus as set forth in claim 1 wherein said sleeve has an annular flange at one end thereof constituting a first sealing ring for said reverse acting dome engaging the face of said annular flange of said reverse acting dome on the convex side thereof, and wherein said reverse acting rupture disk means further comprises a second sealing ring engageable with the other face of said annular flange of said reverse acting dome, said sealing rings being centered relative to said reverse acting dome and being substantially stiffer than the annular flange of said reverse acting dome, said sealing rings and the annular flange of said reverse acting dome being sealingly secured together whereby said sealing rings uniformly support said reverse acting dome so that it will reliably snap over center when subjected to said predetermined pressure level.

3. Apparatus as set forth in claim 2 wherein the outer diameters of said sealing rings and of said annular flange of said reverse acting dome are substantially equal, and wherein the outer peripheral edges of said sealing rings and said annular flange of said reverse acting dome are welded together by a continuous seal weld around the outer edges of the sealing rings.

4. Apparatus for protecting a fluid pressure system from over-pressure comprising an assembly of a reverse acting rupture disk means, knife means, a spacer ring, and a prebulged rupture disk means adapted to be sealingly mounted in an outlet of said system between inner and outer companion flanges of the outlet, said reverse acting rupture disk means having a part spherical, thin rupturable dome and a generally flat annular flange surrounding the dome and integral therewith, the flange of the reverse acting dome fitting on the inner flange of the said outlet with said dome being directed upstream in said outlet for exposure of the convex face of the reverse acting rupture dome to the system fluid pressure, said reverse acting dome being adapted to snap over center from a convex to a concave configuration upon said system fluid pressure exceeding a predetermined pressure level, said spacer ring fitting on the face of said flange of said reverse acting dome opposite said inner flange of said outlet, said knife means being carried by said spacer ring for cutting said reverse acting dome as the latter snaps over center, said prebulged rupture disk means comprising a part spherical, thin rupturable dome and an annular flange surrounding said prebulged dome and being integral therewith, one face of said annular flange of said prebulged dome fitting on the other face of said other spacer ring and the other face of the last-said annular flange fitting on the outer flange of said outlet with the concave face of said prebulged dome facing the concave face of said reverse acting dome whereby said prebulged dome is adapted to burst upon its concave face being subjected to said system fluid pressure as occassioned by the rupture of said reverse acting dome, said outlet having a bore, and said apparatus further comprising guide means for alignment of said dome of said reverse acting rupture disk means with respect to the bore of said outlet, said apparatus further having means for aligning said spacer ring with respect to said reverse acting rupture disk means.

5. Apparatus as set forth in claim 4 wherein said knife means is secured to said spacer ring.

6. Apparatus as set forth in claim 4 wherein said prebulged rupture disk means entraps any of said fluid which escapes past said reverse acting rupture disk means, and wherein said spacer ring has a radial port therethrough for the outflow of said entrapped fluid from between said reverse acting and said prebulged rupture disk means.

7. Apparatus as set forth in claim 4 wherein said knife means comprises at least two diametric blades secured to said spacer ring, each of said blades having a portion adjacent their ends constituting said alignment means and extending outwardly beyond the surface of said spacer ring for engagement with said reverse acting rupture disk means so as to center the spacer ring and said knife blades with respect to said reverse acting rupture disk means.

8. Apparatus as set forth in claim 4 further comprising a shut-off valve interposed between said reverse acting rupture disk means and said outlet, said valve being normally open to permit the system pressure to act against said reverse acting rupture disk means and being selectively operable to isolate said rupture disk means from said system pressure.

9. Apparatus as set forth in claim 8 wherein said shut-off valve is a butterfly valve.

10. Apparatus for protecting a fluid pressure system from over-pressure comprising an assembly of a reverse acting rupture disk means, knife means, a spacer ring, and a prebulged rupture disk means adapted to be sealingly mounted in an outlet of said system between inner and outer companion flanges of the outlet, said reverse acting rupture disk means having a part spherical, thin rupturable dome and a generally flat annular flange surrounding the dome and integral therewith, the flange of the reverse acting dome fitting on the inner flange of the said outlet with said dome being directed upstream in said outlet for exposure of the convex face of the reverse acting rupture dome to the system fluid pressure, said reverse acting dome being adapted to snap over center from a convex to a concave configuration upon said system fluid pressure exceeding a predetermined pressure level, said spacer ring fitting on the face of said flange of said reverse acting dome opposite said inner flange of said outlet, said knife means being carried by said spacer ring for cutting said reverse acting dome as the latter snaps over center, said prebulged rupture disk means comprising a part spherical, thin rupturable dome and an annular flange surrounding said prebulged dome and being integral therewith, one face of said annular flange of said prebulged dome fitting on the other face of said spacer ring and the other face of the last said annular flange fitting on the outer flange of said outlet with the concave face of said prebulged dome facing the concave face of said reverse acting dome whereby said prebulged dome is adapted to burst upon its concave face being subjected to said system fluid pressure as occassioned by the rupture of said reverse acting dome, said pressure system further including discharge piping connected to said outer outlet flange to direct the flow of fluid from said outlet in the event said reverse acting and prebulged rupture disk means are ruptured, said discharge piping having a circular bore, said apparatus further including means for aligning the prebulged dome with respect to said discharge piping bore.

11. Apparatus as set forth in claim 10 wherein said aligning means comprises a tubular sleeve of somewhat smaller diameter than the bore of said discharge piping, said sleeve being secured to said annular flange of said prebulged dome and extending into said discharge piping bore whereby the sleeve centers the prebulged dome with respect to the discharge piping bore.

12. Apparatus as set forth in claim 11 wherein said sleeve has an annular flange at one end thereof constituting a first sealing ring for said prebulged dome engaging the face of said annular flange of said prebulged dome on the convex side thereof, and wherein said prebulged rupture disk means comprises a second sealing ring engageable with the other face of said annular flange of said prebulged dome, said sealing rings being centered relative to said prebulged dome and being substantially stiffer than said annular flange of said prebulged dome, said sealing rings and said annular flange of said prebulged dome being sealingly secured together whereby said sealing rings uniformly support said prebulged dome so that it reliably bursts when it is subjected to said predetermined pressure levels as occasioned by the rupture of said reverse acting rupture disk means.

13. Apparatus as set forth in claim 12 wherein the outer diameters of said sealing rings and of said annular flange of said prebulged dome are substantially equal, and wherein the outer peripheral edges of said sealing rings and said annular flange of said prebulged dome are welded together by a continuous seal weld around outer edges of the sealing rings.

14. Apparatus for protecting a fluid pressure system for over-pressurization, the pressure system having a flanged outlet with a bore therein in communication with said system pressure, said apparatus comprising:

a normally open butterfly valve sealingly seated on said outlet flange;

a connector having a bore therethrough, a first flange at one end thereof sealingly seated on the other side of said butterfly valve, and a second flange at the other end of the connector;

a plurality of bolts interconnecting said outlet flange and said first connector flange for sealingly securing the butterfly valve between said outlet flange and said first connector flange; said rutpure disk means secured to said second connector flange adapted to rupture when subjected to a predetermined system pressure level thereby to protect said fluid pressure system from over-pressurization, said rupture disk means comprising reverse acting rupture disk means having a part-spherical dome of thin rupturable material adapted to abruptly snap over center when its convex face is subjected to a predetermined fluid pressure level, a generally flat annular flange surrounding said dome and integral therewith, a pair of sealing rings sealingly secured to said annular ring, one of said sealing rings being disposed on each side of said annular flange, and a tubular sleeve secured to one of said sealing rings and extending from said one sealing ring in the same direction as said dome, said sleeve having a diameter somewhat smaller than the diameter of the bore of said connector and thereby to center said reverse acting rupture disk means with respect to the bore of said connector, said dome being oriented so that it extends into the bore of said connector and into said sleeve so that the system pressure acts against its convex face, said rupture disk means further comprising a spacer ring sealingly seated on the other of said sealing rings on the concave side of said reverse acting rupture disk, knife blade means carried by said spacer ring for cutting said reverse acting rupture disk upon the latter snapping over center when subjected to said predetermined pressure level, and prebulged rupture disk means having a part spherical dome of thin rupturable material, an annular flange integral with said prebulged spherical dome, and sealing rings sealingly secured to opposite faces of the annular flange of said prebulged dome, said prebulged dome being oriented so that its concave face is toward said reverse acting rupture disk means and being adapted to burst when its concave face is subjected to a pressure level less than or equal to said predetermined pressure level, said apparatus further comprising an outlet mounting flange sealingly seated against one of said sealing rings of said prebulged rupture dome on the convex side thereof and a plurality of bolts interconnecting said second connector mounting flange and said outlet mounting flange for sealingly securing together said reverse acting rupture disk means, said spacer ring, and said prebulge rupture disk means.

* * * * *